July 17, 1923.
N. H. SMITH
STUMP SOCK
Filed Dec. 28, 1921
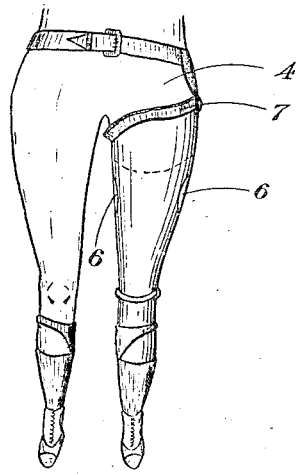
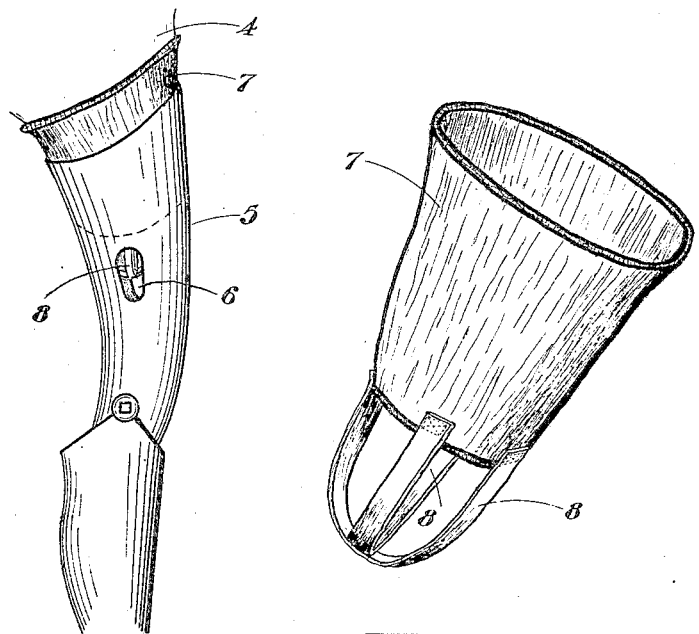
1,461,987
INVENTOR
*Norman H. Smith.*
BY
*E H Bond*
ATTORNEY Patented July 17, 1923.

1,461,987

UNITED STATES PATENT OFFICE.

NORMAN H. SMITH, OF OTTAWA, ONTARIO, CANADA.

STUMP SOCK.

Application filed December 28, 1921. Serial No. 525,507.

*To all whom it may concern:*

Be it known that I, NORMAN H. SMITH, a citizen of the Dominion of Canada, residing at Ottawa, in the county of Carleton and Province of Ontario, Canada, have invented certain new and useful Improvements in Stump Socks, of which the following is a specification.

This invention relates to a stump sock and the principal object of my invention is to provide a sock which is open at the lower end and which has been found by use to allow ventilation to the limb stump.

A further object is to provide a means whereby the sock can be pulled down into the artificial limb so as to comfortably position the artificial limb on to the limb stump.

With these and other objects in view, the invention consists in the construction, combination and arrangement of parts as will be hereinafter more fully described, illustrated in the accompanying drawings and pointed out in the claim hereunto appended.

Figure 1 is a view showing the sock in position.

Figure 2 is an enlarged side detail of the same.

Figure 3 is an enlarged perspective view of my improved stump sock.

Referring to the drawings, like numerals designate like parts in the various drawings.

4 illustrates the limb stump, 5 an artificial limb which is provided with openings 6 on the sides.

The stump sock 7 may be knitted similar to the leg portion of an ordinary sock but in the size to fit the limb stump 4. The lower portion of the sock will be tapered slightly smaller than the upper portion so that this end will somewhat overlap the end of the limb stump. 8 indicates strips of material which are suitably attached to the lower end of the stump sock and which strips cross each other intermediate their ends. These strips 8 act as means of pulling the sock, by inserting the fingers in opening 6 and engaging the strips 8 with a slightly downward pressure. In this way, the stump sock can be comfortably positioned between the limb stump and the artificial limb.

By having the lower end of the stump sock 7 open, the end of the limb stump is uncovered and ventilation will pass through the openings 6 to the limb stump. In this way, any perspiration of the limb stump which is absorbed by the stump sock will be allowed to evaporate and will eliminate the soreness often caused by the perspiration being retained by the ordinary closed stump sock.

In the drawings, I have illustrated the limb stump as shown above the knee. It must be appreciated that this is for illustrative purpose only and that the same construction of a stump sock may be used for a limb stump below the knee as well and the same beneficial results will be obtained.

From the foregoing, it is thought that the construction of my invention will be clearly understood and, therefore, a more extended explanation has been omitted.

What I claim as new is:

A stump sock consisting of a leg portion of seamless pliable material of tapered form, the lower end of which is open, and spaced strips crossed and attached to the lower end of the leg portion so that the stump sock may be comfortably pulled down after being positioned in the artificial limb.

In testimony whereof, I affix my signature in the presence of two witnesses.

NORMAN H. SMITH.

Witnesses:
M. McMILLAN,
S. BOGUE.